United States Patent
Flickinger et al.

(10) Patent No.: US 9,807,937 B2
(45) Date of Patent: Nov. 7, 2017

(54) AGRICULTURAL HARVESTER WITH IMPROVED ROTOR TRANSITION GEOMETRY

(71) Applicant: CNH Industrial America LLC, New Holland, PA (US)

(72) Inventors: Wayne T. Flickinger, Oxford, PA (US); Jonathan E. Ricketts, Coal Valley, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/801,353

(22) Filed: Jul. 16, 2015

(65) Prior Publication Data

US 2017/0013781 A1   Jan. 19, 2017

(51) Int. Cl.
*A01D 34/00*   (2006.01)
*A01F 7/06*   (2006.01)
*A01F 12/10*   (2006.01)
*A01F 12/24*   (2006.01)

(52) U.S. Cl.
CPC ............... *A01F 7/06* (2013.01); *A01F 12/10* (2013.01); *A01F 12/24* (2013.01)

(58) Field of Classification Search
CPC .......... A01F 7/06; A01F 12/442; A01F 12/00; A01F 12/26; A01F 12/10
USPC ............................ 56/14.6; 460/70, 68, 80, 46
See application file for complete search history.

(56) References Cited

U.S. PATENT DOCUMENTS

| | | | |
|---|---|---|---|
| 3,410,270 A | 11/1968 | Herbsthofer | |
| 3,669,122 A | 6/1972 | Rowland-Hill | |
| 3,828,793 A * | 8/1974 | Gochanour | A01F 12/00 460/70 |
| 3,844,293 A | 10/1974 | Young | |
| 3,982,549 A * | 9/1976 | De Pauw | A01F 12/20 460/67 |
| 3,994,304 A * | 11/1976 | Todd | A01F 12/10 460/70 |
| 4,159,023 A | 6/1979 | Todd et al. | |
| 4,291,709 A | 9/1981 | Weber et al. | |

(Continued)

FOREIGN PATENT DOCUMENTS

GB   2015855 A   9/1979
WO   2014070397 A1   5/2014

*Primary Examiner* — Árpád Fábián-Kovács
(74) *Attorney, Agent, or Firm* — Peter K. Zacharias; Patrick M. Sheldrake (57) ABSTRACT

An agricultural harvester includes a chassis and a threshing and separating system carried by the chassis that is configured for threshing and separating grain from gathered crop material. The threshing and separating system includes: a rotor defining a longitudinal axis; a concave at least partially surrounding the rotor; a transition cone defining an infeed to the rotor; and a transition surface connecting the transition cone to the concave and having a conical portion defined about the longitudinal axis and a blended portion connected to the conical portion. The blended portion defines a first end connected to the conical portion and a second end distanced from the first end in a lateral direction. The blended portion defines a substantially conical shape about the longitudinal axis at the first end and approaches a substantially cylindrical shape about the longitudinal axis toward the second end.

14 Claims, 9 Drawing Sheets

(56) References Cited

U.S. PATENT DOCUMENTS

| | | | | |
|---|---|---|---|---|
| 4,611,605 A * | 9/1986 | Hall | A01F 7/06 460/80 |
| 4,739,773 A * | 4/1988 | West | A01F 12/442 460/113 |
| 5,145,462 A * | 9/1992 | Tanis | A01F 12/10 460/68 |
| 5,257,959 A * | 11/1993 | Tanis | A01F 12/10 460/67 |
| 5,342,239 A * | 8/1994 | West | A01F 12/22 460/110 |
| 6,129,629 A * | 10/2000 | Dammann | A01F 12/442 460/67 |
| 6,517,431 B2 * | 2/2003 | Schwersmann | A01F 12/10 460/16 |
| 6,679,773 B2 * | 1/2004 | Schwersmann | A01F 12/10 460/69 |
| 6,780,102 B2 * | 8/2004 | Visagie | A01F 12/442 460/46 |
| 6,830,512 B2 * | 12/2004 | Tanis | A01F 7/06 460/46 |
| 7,462,101 B2 * | 12/2008 | Grywacheski | A01F 12/20 460/119 |
| 7,682,236 B2 | 3/2010 | Büermann et al. | |
| 7,717,777 B2 * | 5/2010 | Pope | A01F 7/067 460/69 |
| 8,109,815 B2 * | 2/2012 | Hollatz | A01F 7/067 460/16 |
| 8,118,652 B2 * | 2/2012 | Hollatz | A01F 7/06 460/113 |
| 8,221,202 B2 | 7/2012 | Pope et al. | |
| 8,636,568 B1 | 1/2014 | Farley | |
| 2002/0045469 A1 * | 4/2002 | Schwersmann | A01F 7/06 460/70 |

\* cited by examiner

AGRICULTURAL HARVESTER WITH IMPROVED ROTOR TRANSITION GEOMETRY

BACKGROUND OF THE INVENTION

1. Field of the Invention

The present invention relates to agricultural harvesters, and, more particularly, to rotor assemblies for agricultural harvesters.

2. Description of the Related Art

An agricultural harvester known as a "combine" is historically termed such because it combines multiple harvesting functions with a single harvesting unit, such as picking, threshing, separating and cleaning. A combine includes a header, which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

In combines that incorporate a rotor within a concave formed as a rotor cage, there is typically a transition cone between the feeder housing and the rotor cage that narrows along a length of the rotor. The transition cone directs the gathered crop material toward the rotor cage while narrowing, acting as a funnel for the gathered crop material toward the rotor.

One problem that has been observed in known transition cones is a high amount of congestion and wear between the transition cone and the rotor cage. This wear is indicative of high crop pressure, which can lead to high power consumption and an inefficient conveyance of material. U.S. Pat. No. 4,291,709 to Weber et al. describes one explored way of solving this problem by creating segmented steps in the transition cone toward the rotor cage. A problem with this approach is that the segmented steps of the transition cone can become congestion points themselves where high crop pressure exists. An alternative way to solve the aforementioned problem is described by U.S. Pat. No. 3,844,293 to Young, which describes a truncated cone-shaped housing for the rotor. As with Weber et al., the housing described by Young has steps between the cone and the rotor cage that can become congestion points.

What is needed in the art is a threshing and separating system that experiences lowered wear and crop pressure between the transition cone and the concave.

SUMMARY OF THE INVENTION

The present invention provides a transition surface between the transition cone and concave that blends the shapes of the transition cone and concave.

The invention in one form is directed to an agricultural harvester including a chassis and a threshing and separating system carried by the chassis that is configured for threshing and separating grain from gathered crop material. The threshing and separating system includes: a rotor defining a longitudinal axis; a concave at least partially surrounding the rotor; a transition cone defining an infeed to the rotor; and a transition surface connecting the transition cone to the concave and having a conical portion defined about the longitudinal axis and a blended portion connected to the conical portion. The blended portion defines a first end connected to the conical portion and a second end distanced from the first end in a lateral direction. The blended portion defines a substantially conical shape about the longitudinal axis at the first end and approaches a substantially cylindrical shape about the longitudinal axis toward the second end.

The invention in another form is directed to a rotor housing including a concave defining a cylindrical shape about a longitudinal axis; a transition cone connected to the concave and defining a conical shape about the longitudinal axis; and a transition surface connecting the transition cone to the concave and having a conical portion defined about the longitudinal axis and a blended portion connected to the conical portion. The blended portion defines a first end connected to the conical portion and a second end distanced from the first end in a lateral direction. The blended portion defines a substantially conical shape about the longitudinal axis at the first end and approaches a substantially cylindrical shape about the longitudinal axis toward the second end.

An advantage of the present invention is that the transition surface provides a smooth transitional shape in both axial and rotational directions for crop material to flow across between the transition cone and the concave.

Another advantage is the rotor power consumption can be decreased since there is reduced crop pressure.

Yet another advantage is there can be decreased back feeding to the feeder housing due to less restriction of crop material flow in the transition cone.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
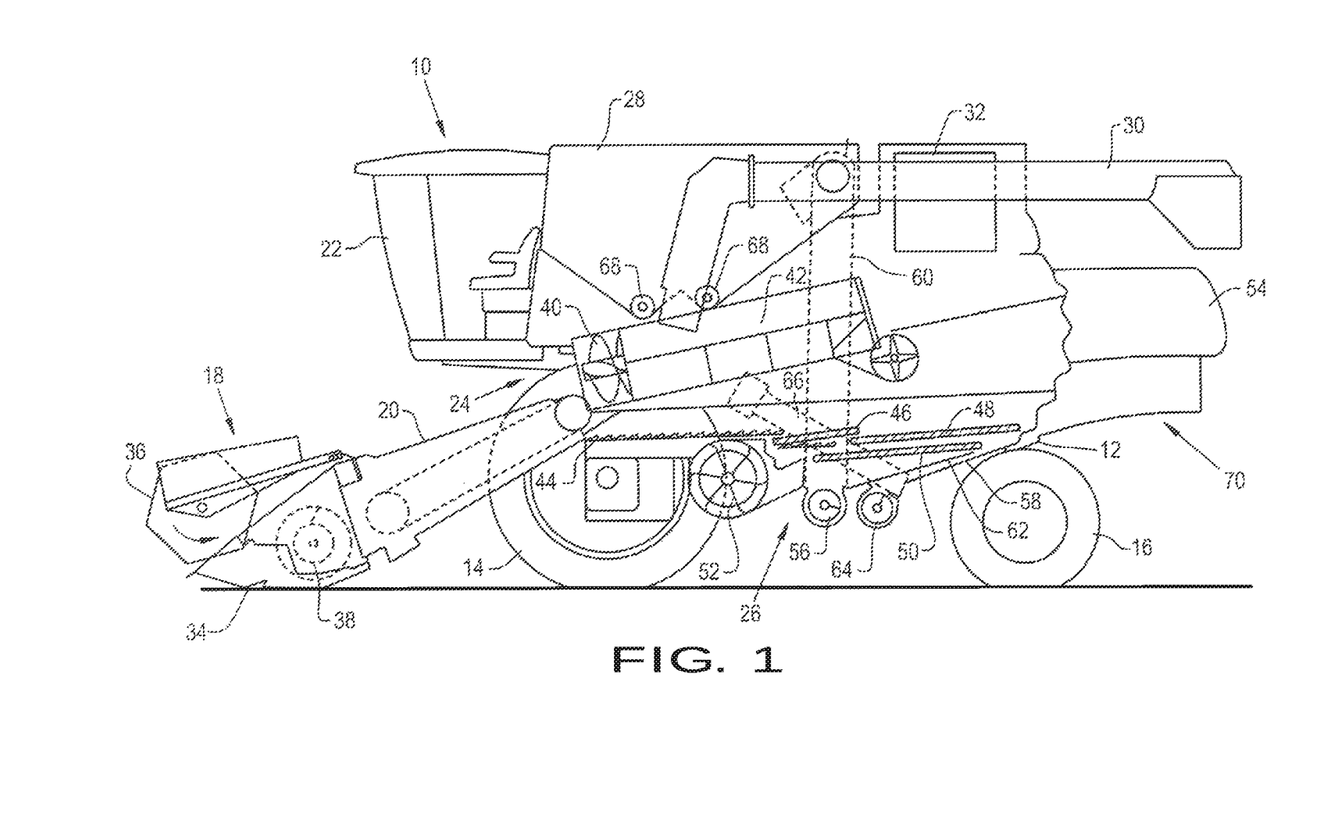
FIG. 1 is a side view of an agricultural harvester according to the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc.

The front wheels 14 are larger flotation type wheels, and the rear wheels 16 are smaller steerable wheels. Motive force is selectively applied to the front wheels 14 through a power plant in the form of a diesel engine 32 and a transmission (not shown). Although the combine 10 is shown as including wheels, is also to be understood that the combine 10 may include tracks, such as full tracks or half-tracks.

The header 18 is mounted to the front of the combine 10 and includes a cutter bar 34 for severing crops from a field during forward motion of the combine 10. A rotatable reel 36 feeds the crop into the header 18, and an auger 38 feeds the severed crop laterally inwardly from each side toward the feeder housing 20. The feeder housing 20 conveys the cut crop to the threshing and separating system 24, and is selectively vertically movable using appropriate actuators, such as hydraulic cylinders (not shown).

The threshing and separating system 24 is of the axial-flow type, and generally includes a rotor 40 at least partially enclosed by and rotatable within a corresponding perforated concave 42 which can be, for example, formed as a rotor cage. Although the concave 42 is shown and described further herein as a rotor cage, it should be appreciated that the concave 42 can be formed as any sort of suitable threshing concave. The cut crops are threshed and separated by the rotation of the rotor 40 within the rotor cage 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the rotor cage 42.

Grain, which has been separated by the threshing and separating assembly 24, falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52 which provides an airflow through the sieves to remove chaff and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across the sieves 48, 50, while permitting the passage of cleaned grain by gravity through the openings of the sieves 48, 50.

Clean grain falls to a clean grain auger 56 positioned crosswise below and in front of the lower sieve 50. The clean grain auger 56 receives clean grain from each sieve 48, 50 and from the bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via the tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

The non-grain crop material proceeds through a residue handling system 70. The residue handling system 70 may include a chopper, counter knives, a windrow door and a residue spreader.

Figure 2:
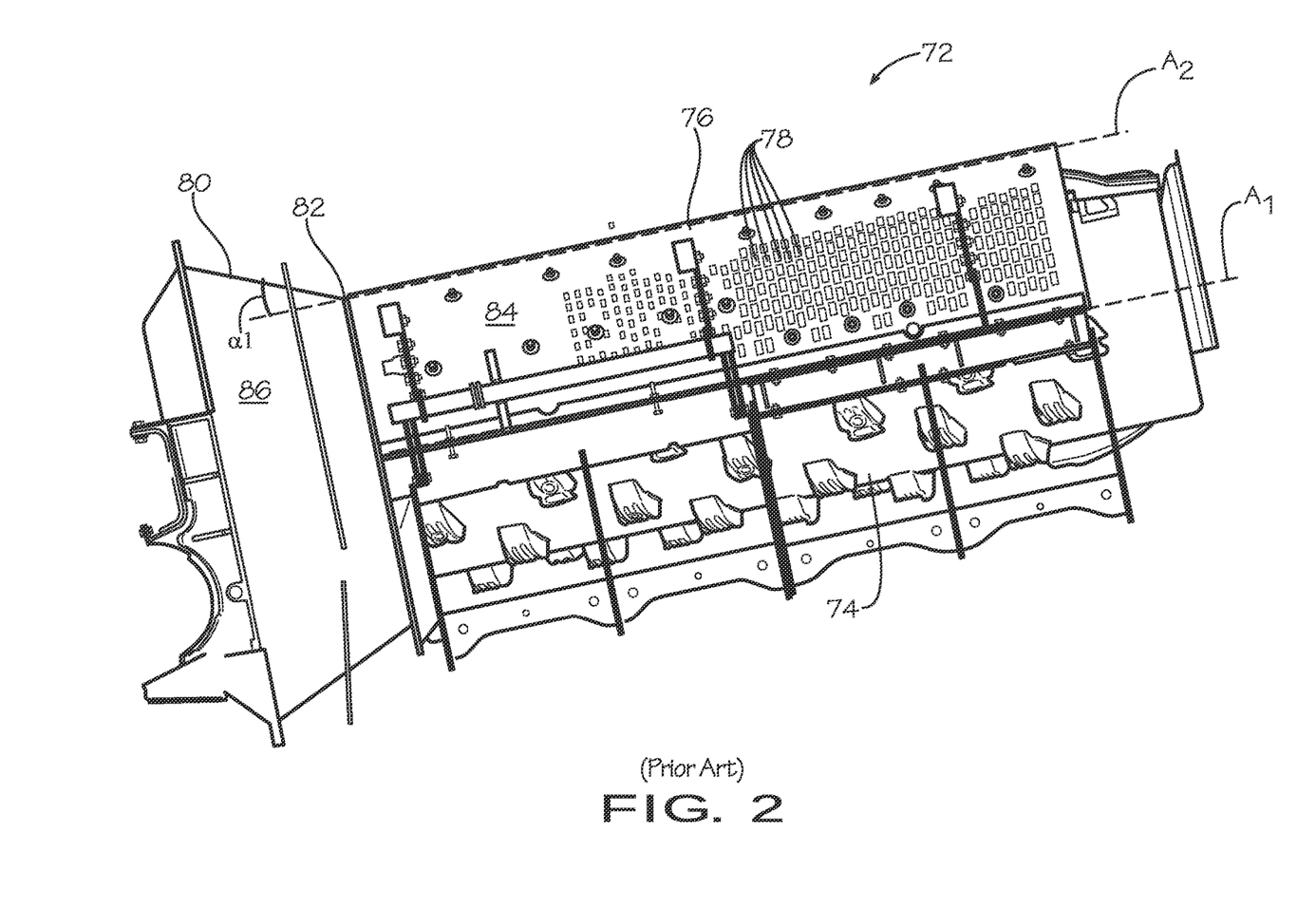
FIG. 2 is a side view of a portion of a prior art rotor assembly.
Figure 3:
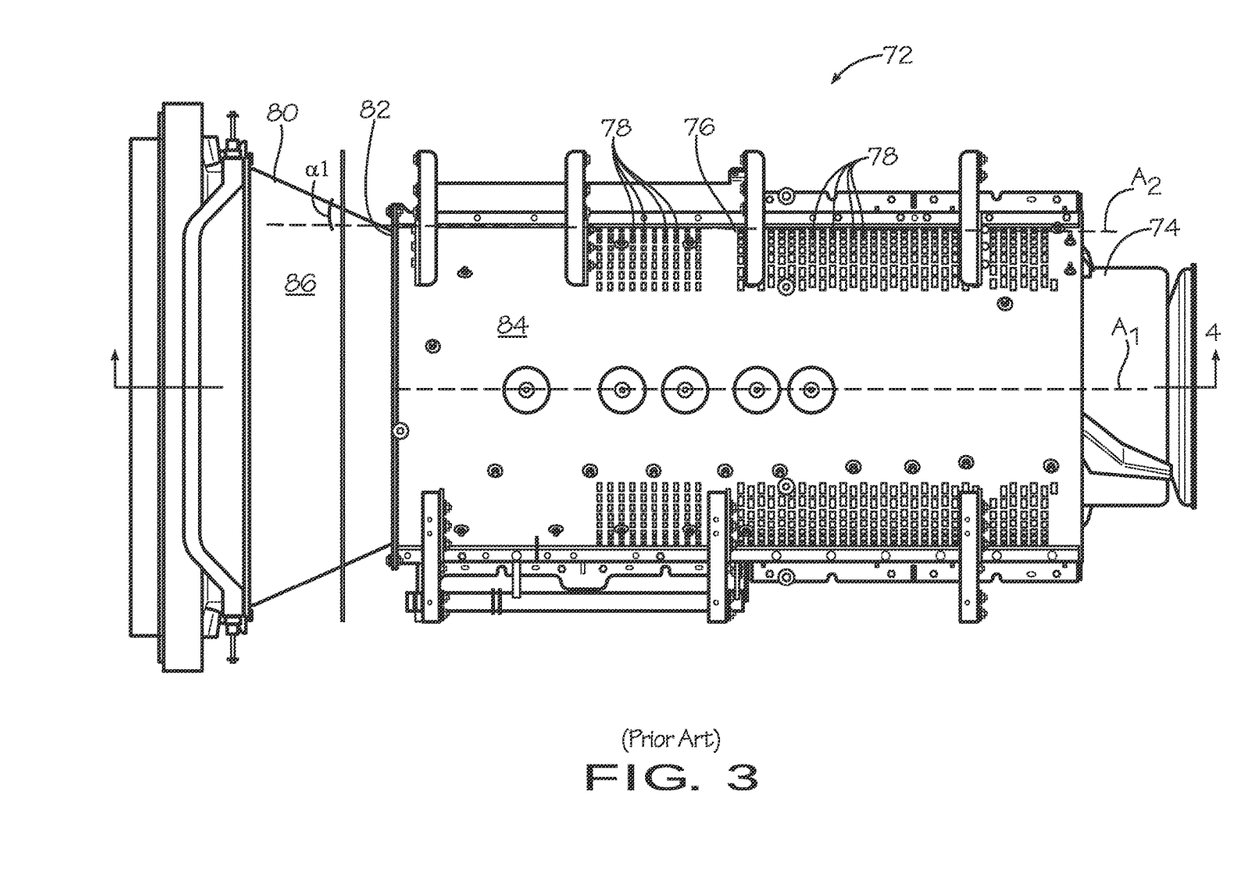
FIG. 3 is a top view of the rotor assembly shown in FIG. 2.
Figure 4:
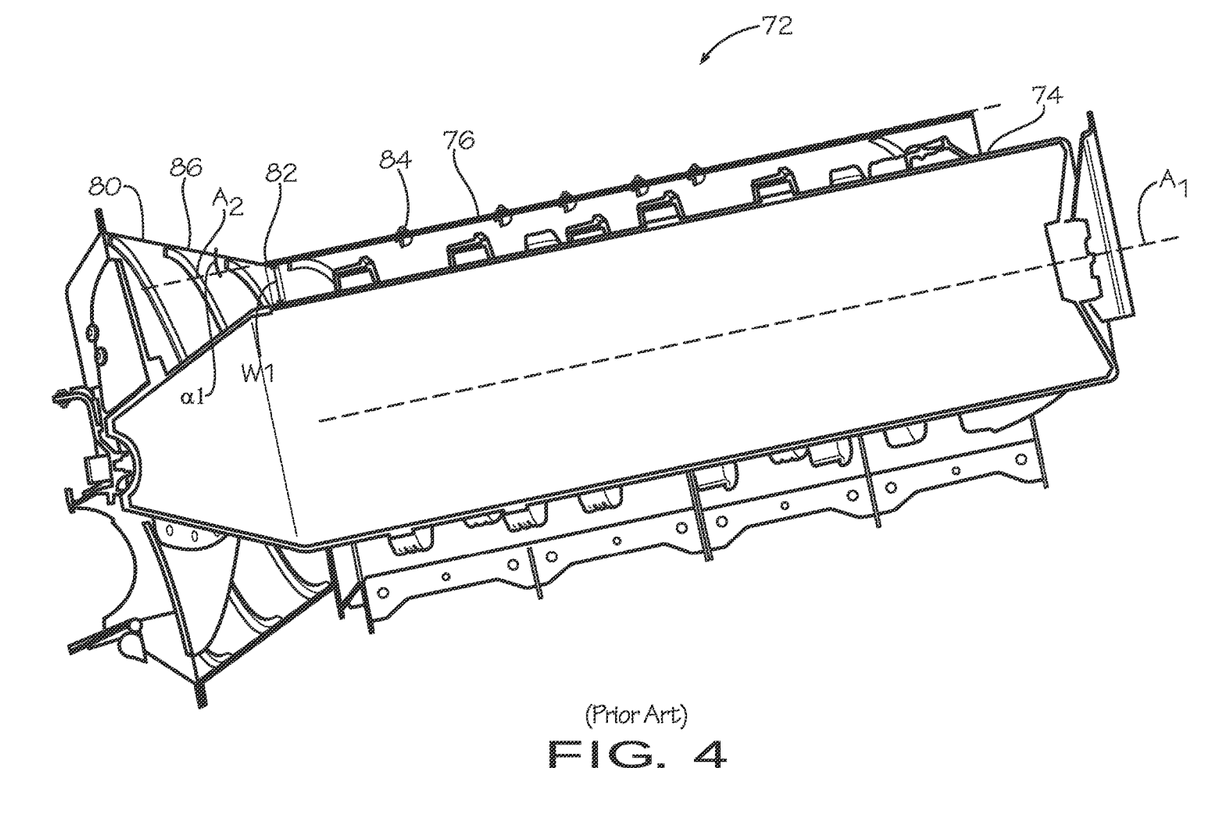
FIG. 4 is a cross-sectional view of the rotor assembly shown in FIGS. 2-3 taken along line 4-4 in FIG. 3.

Referring now to FIGS. 2-4, a prior art rotor assembly 72 which can be included in a threshing and separating system is shown and generally includes a rotor 74 defining a longitudinal axis A1, a concave formed as a rotor cage 76 partially surrounding the rotor 74 and having perforations 78 formed through, and a transition cone 80 connected to the rotor cage 76 at a connection point 82 and defining an infeed to the rotor 74 from, for example, a feeder housing. As can be seen in FIGS. 2-3, the transition cone 80 has a conical shape defined about the longitudinal axis A1 that ends abruptly at the connection point 82 between the transition cone 80 and the rotor cage 76. The transition cone 80 has a tapering diameter along its length so that as the transition cone 80 approaches the connection point 82, the transition cone 80 narrows. The rotor cage 76, as shown, has a cylindrical shape and is roughly coaxial with the rotor 74 about the longitudinal axis A1 so that the rotor cage 76 has a surface 84 defining a concave axis A2 that extends generally parallel to the longitudinal axis A1. As used herein, "generally parallel" signifies that the longitudinal axis A1 defined by the rotor 74 and the concave axis A2 defined by the surface 84 of the rotor cage 76 may not be completely parallel, i.e., not forming intersecting angles relative to one another, due to standard manufacturing tolerances, but is functionally equivalent to parallel.

As can be seen in FIG. 4, the transition cone 80 has a cone surface 86 defining a cone angle $\alpha 1$ relative to the concave axis A2. Since the transition cone 80, as shown, gradually tapers toward the connection point 82, i.e., the transition cone 80 has a constantly decreasing radius, the cone angle $\alpha 1$ is linear as the transition cone 80 approaches the connection point 82. This linear cone angle $\alpha 1$ results in crop material congestion at the connection point 82 due to a reduced clearance W1 between the rotor 74 and the connection point 82, as well as increased crop pressure and wear.

Figure 5:
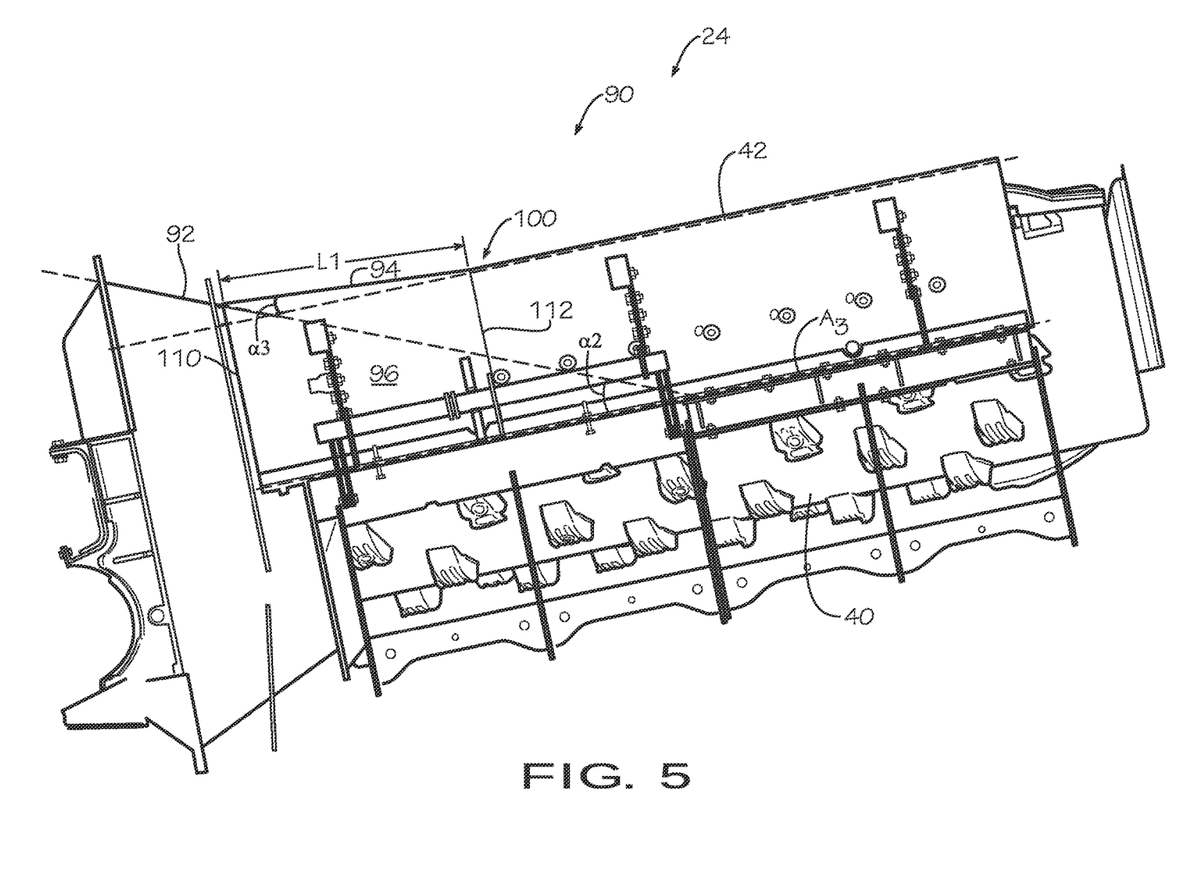
FIG. 5 is a side view of an embodiment of a rotor assembly formed according to the present invention.
Figure 6:
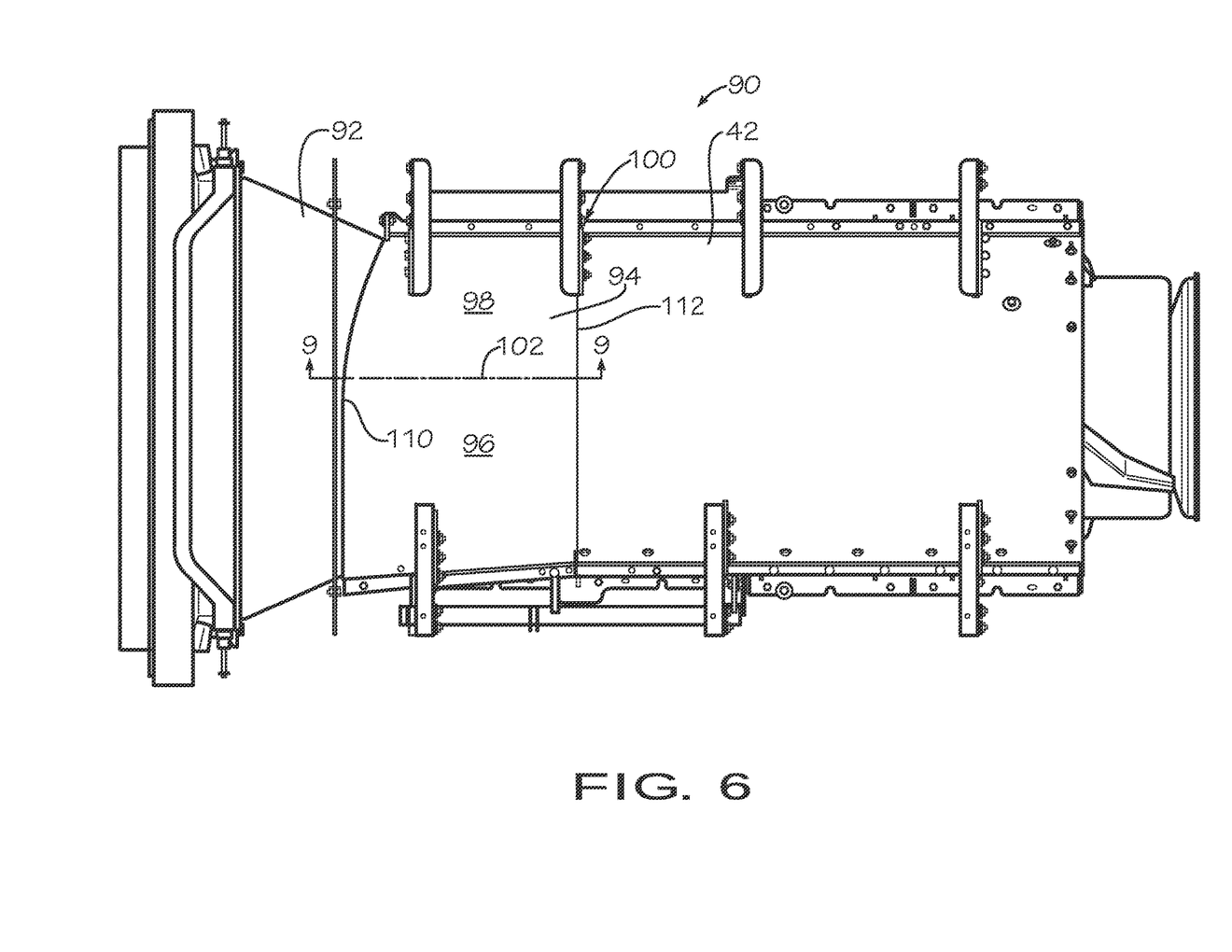
FIG. 6 is a top view of the rotor assembly shown in FIG. 5.
Figure 7:
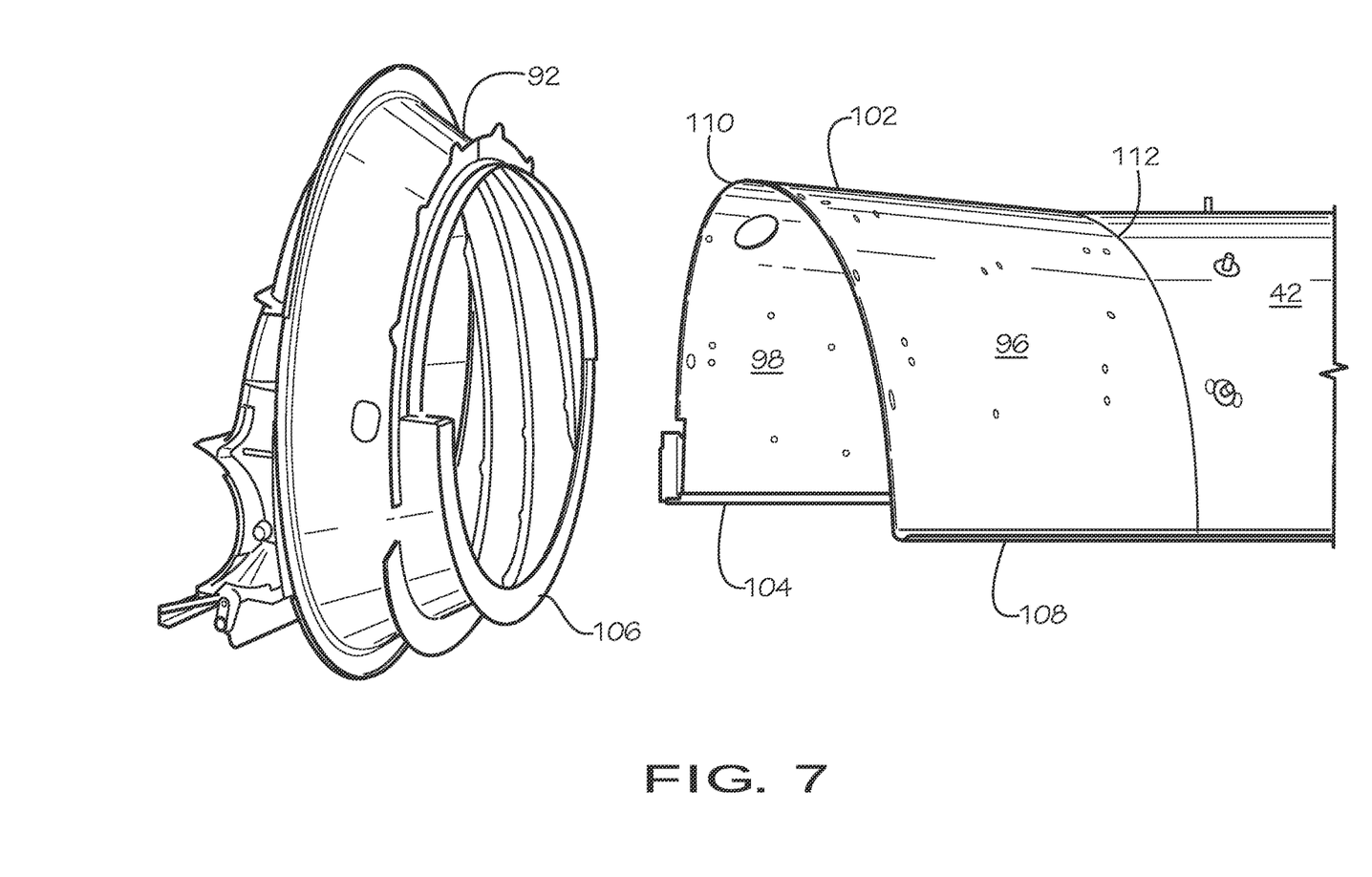
FIG. 7 is a partially exploded view of a rotor housing shown in FIGS. 5-6.

Referring now to FIGS. 5-7 and specifically FIG. 5, a rotor assembly 90, which can be included in the threshing and separating system 24, is shown and generally includes a rotor 40 defining a longitudinal axis A3, a concave 42 (shown as a rotor cage) at least partially surrounding the rotor 40, a transition cone 92 defining an infeed to the rotor 40, and a transition surface 94 connecting the transition cone 92 to the rotor cage 42. The transition cone 92 can define an infeed to the rotor 40 from, for example, the feeder housing 20 previously described so that gathered crop material axially flows toward the rotor 40. As can be seen, the rotor cage 42 has a generally cylindrical shape defined about the longitudinal axis A3 and the transition cone 92 has a generally conical cross-section defined about the longitudinal axis A3. The transition cone 92 can define a linear cone angle $\alpha 2$ relative to the longitudinal axis A3 so that the diameter of the transition cone 92 is constantly decreasing in a direction toward the rotor cage 42, whereas the diameter of the rotor cage 42 can be generally constant throughout. As shown, the transition cone 92 can have a relatively steep cone angle $\alpha 2$, such as greater than 20°. It should be appreciated that the transition cone 92 is not a closed cone, which would not allow crop material to be fed to the rotor 40, but an open cone.

The transition surface 94 connects the transition cone 92 to the rotor cage 42 and includes a conical portion 96 defined about the longitudinal axis A3 and a blended portion 98 (best shown in FIGS. 6-8) connected to the conical portion 96. The transition surface 94 can be formed integrally with or connected to the rotor cage 42 to form a rotor housing 100 that connects to the transition cone 92 and partially surrounds the rotor 40. While only one transition surface 94 is shown as being part of an upper half of the rotor housing 100, the shown transition surface 94 can be mirrored across the longitudinal axis A3. The conical portion 96 has a conical shape defined about the longitudinal axis A3, i.e., the conical portion 96 radially narrows relative to the longitudinal axis A3 along a transition length L1 of the transition surface 94. The conical portion 96 can define a second cone angle $\alpha 3$ relative to the longitudinal axis A3 that can be significantly less than the linear cone angle $\alpha 2$ of the transition cone 92 due to the transition length L1 of the transition surface 94 being greater than a cone length L2 of the transition cone 92.

Referring now to FIG. 7, it can be seen that the blended portion 98 has a first end 102 connected to the conical portion 96 and a second end 104 that is distanced from the first end 102 in a lateral direction. The transition cone 92 can have a cone lip 106 that connects to a lateral end 108 of the conical portion 96 and the second end 104 of the blended portion 98. As can be seen, the conical portion 96 can define a first lateral half of the transition surface 94 and the blended portion 98 can define a second lateral half of the transition surface 94, with the first end 102 of the blended portion 98 defining the boundary of the two lateral halves.

Figure 8:
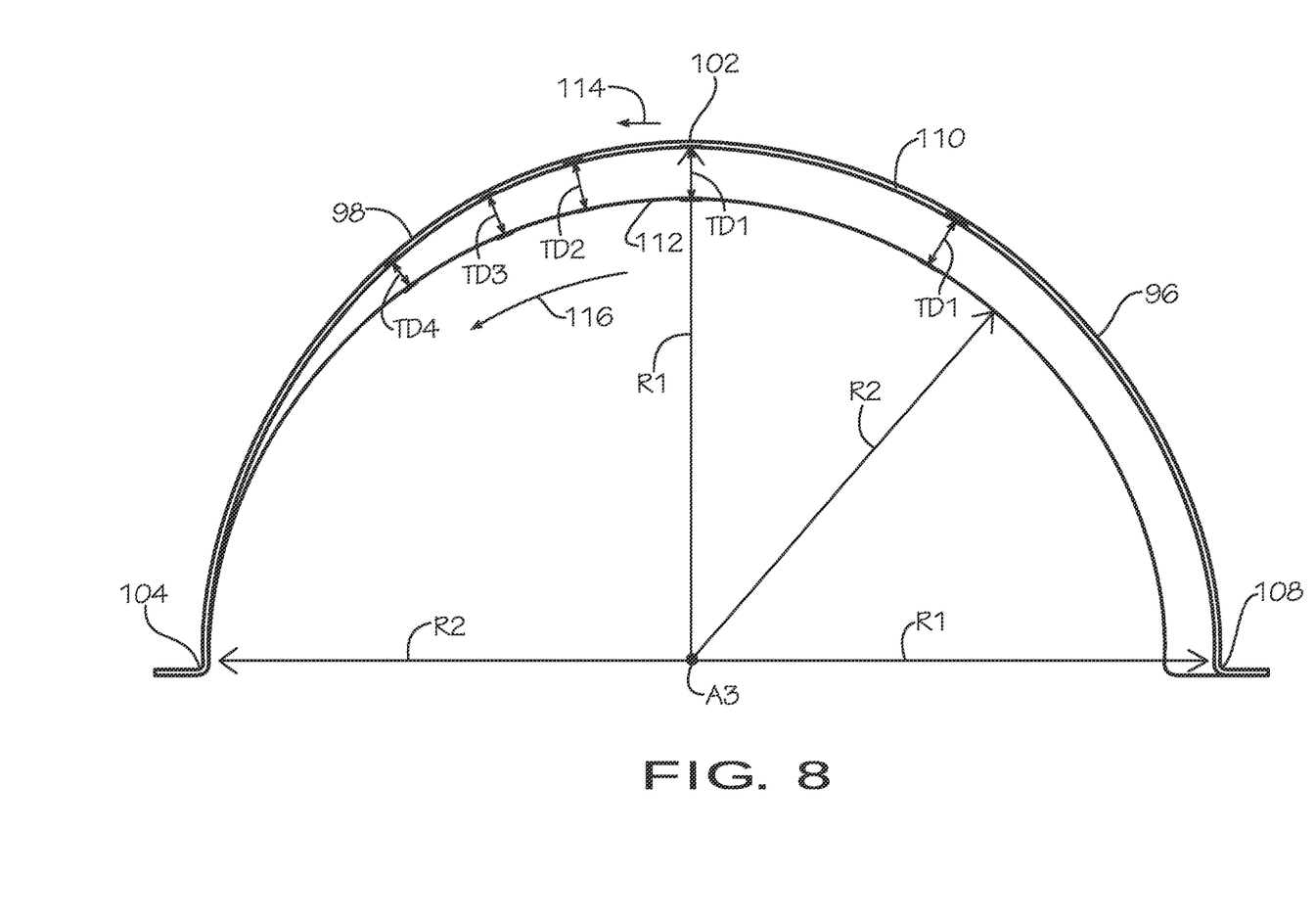
FIG. 8 is a perspective view of a transition surface shown in FIG. 7.

Referring now to FIG. 8, the geometry of the transition surface 94 is shown in better detail. As can be seen, the conical portion 96 and blended portion 98 of the transition surface 94 can be defined about a common center, which can be the longitudinal axis A3, and extend 180° about the longitudinal axis A3 from the lateral end 108 of the conical portion 96 to the second end 104 of the blended portion 98. Since the conical portion 96 defines a conical shape, the conical portion 96 will define a maximum radius R1 relative to the longitudinal axis A3 and a minimum radius R2 relative to the longitudinal axis A3, with the conical portion 96 narrowing from the maximum radius R1 to the minimum radius R2 from a front 110 of the transition surface 94, which can be adjacent to the transition cone 92, to a back 112 of the transition surface 94 which connects to the rotor cage 42. Since the back 112 of the transition surface 94 can be flush with the rotor cage 42, the minimum radius R2 can also define a concave radius of the rotor cage 42 relative to the longitudinal axis A3. The conical portion 96 can define a single taper distance TD1 that signifies the amount of distance that the conical portion 96 tapers from its front to its back and is defined as a difference between the radii of the conical portion 96 at the front 110 of the transition surface 94 and the back 112 of the transition surface 94, which is equivalent to the maximum radius R1 minus the minimum radius R2. In other words, the taper distance of the conical portion 96 (R1-R2) can define the rise of the conical portion 96 and the transition length L1 can define the hypotenuse of the conical portion 96 that help define the second cone angle $\alpha 3$ relative to the longitudinal axis A3.

Unlike the conical portion 96, the blended portion 98 does not have a constant narrowing along its length throughout the blended portion 98. As can be seen in FIG. 8, the blended portion 98 defines a substantially conical shape about the longitudinal axis A3 at its first end 102, i.e., the blended portion 98 narrows similarly to the conical portion 96 along the transition length L1 at the first end 102. As used herein, "substantially conical" refers to the shape of the first end 102 being similar to a true cone in that it narrows along its length at a cone angle. Moving in a lateral direction, signified by arrow 114, away from the first end 102 of the blended portion 98 and toward the second end 104 of the blended portion, the shape of the blended portion 98 moves away from being substantially conical and approaches a substantially cylindrical shape that does not narrow along its length, i.e., the differences between the radius at the front 110 of the transition surface 94 and the radius at the back 112 of the transition surface 94 decrease from the first end 102 of the blended portion 98 toward the second end 104 of the blended portion 98. In this sense, the blended portion 98 is shaped so that the transition surface 94 changes from a conical shape defined by the conical portion 96 and first end 102 of the blended portion 98 toward a cylindrical shape in a rotational direction of the rotor 40 about the longitudinal axis A3, signified by counter-clockwise arrow 116. The second end 104 of the blended portion 98 can therefore have a substantially cylindrical shape where the taper distance is approximately zero, accounting for standard manufacturing tolerances. Since the blended portion 98 changes from a substantially conical shape to a substantially cylindrical shape, the blended portion 98 can define many taper distances TD2, TD3, TD4 between its first end 102 and the second end 104 to gradually approach the substantially cylindrical shape, which has a taper distance of approximately zero, from the substantially conical shape, which has a maximum taper distance equal to the maximum radius R1 minus the minimum radius R2. In other words, the taper distances TD2, TD3, TD4 of the blended portion 98 decrease in the lateral direction 114 toward the second end 104. It should be appreciated that the taper distances TD2, TD3, TD4 of the blended portion 94 are defined from the front 110 of the transition surface 94 to the back 112 of the transition surface 94 along the longitudinal axis A3 so that each taper distance is equal to a radial difference, relative to the longitudinal axis A3, between the front 110 and the back 112 at the same relative lateral position. While the second end 104 is shown as having a substantially cylindrical shape, it is not required to do so; the transition surface 94 only needs to become more cylindrical from the conical first end 102 toward the second end 104. It should be appreciated that the rotational direction 116 of the rotor 40 can be reversed to clockwise, in which case the relative positions of the lateral end 108 of the conical portion 96 and the second end 104 of the blended portion 98 can be reversed to achieve the same blending effect. By blending the substantially conical shape Referring now specifically to FIG. 9, a cross-sectional view of the rotor assembly 90 is shown. To better illustrate the difference in the crop material sweep profile of the rotor assembly 90 shown in FIGS. 5-9 compared to the prior art rotor assembly 72 shown in FIGS. 2-4, dashed lines 118 have been drawn in to show the crop material sweep profile of the prior art rotor assembly 72. The dashed lines 118 therefore represent the material of the transition cone 80 and rotor cage 76 of rotor assembly 72. As can be seen, the dashed lines 118 indicate that there is a significantly smaller clearance W2 defined between the rotor 40 and the crop material sweep profile 118 compared to an increased clearance W3 defined between the rotor 40 and the transition surface 94. The smaller clearance W2 is due in part to a narrowing of the transition cone 80 as well as a corresponding increase in diameter of the rotor 40. To help smooth out crop material flow along the rotor 40, the first end 102 of the blended portion 98 can be aligned, i.e., orthogonal, with the widest part of the rotor 40 relative to the longitudinal axis A3.

Figure 9:
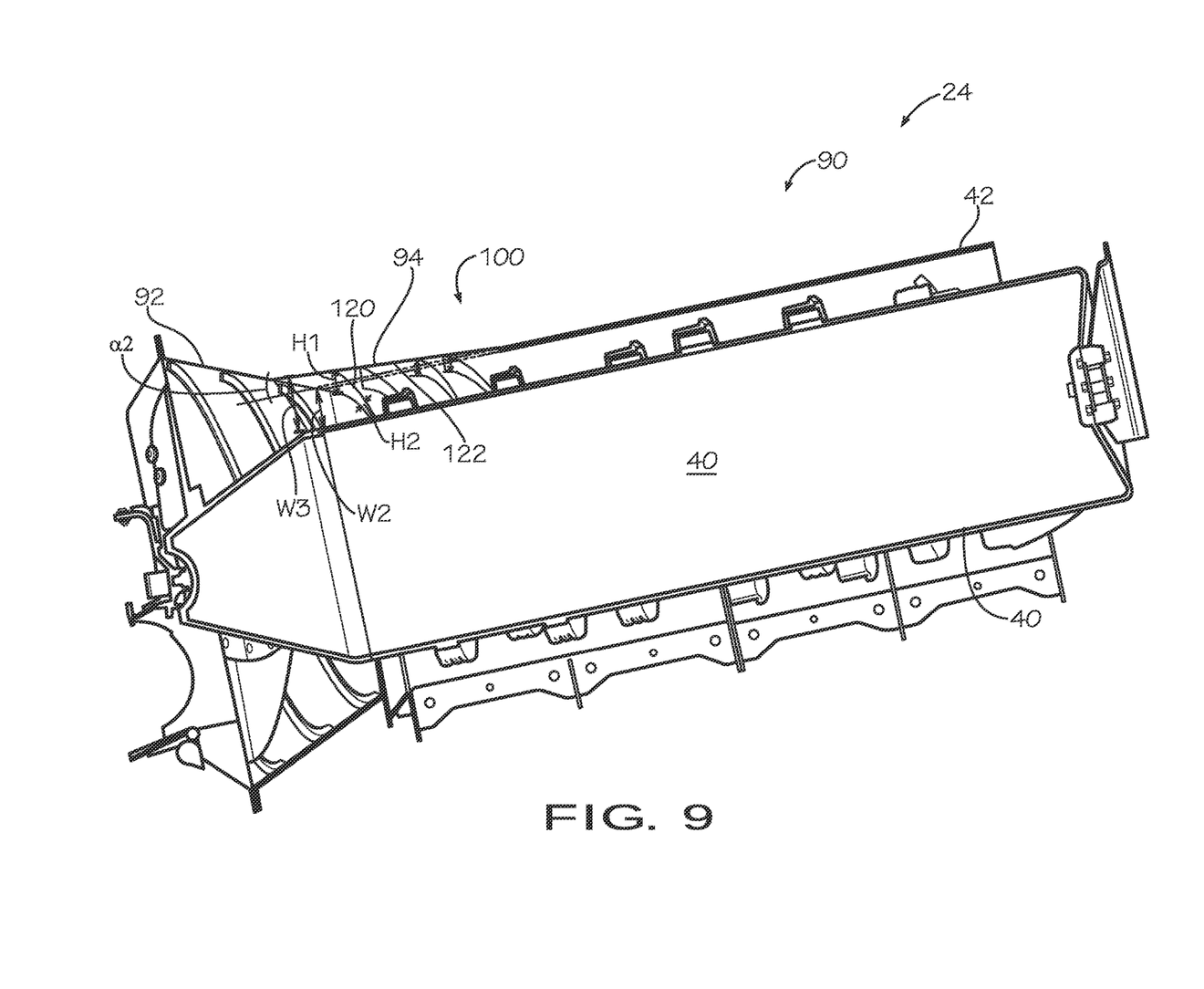
FIG. 9 is a cross-sectional view of the rotor assembly shown in FIGS. 5-6 taken along line 9-9 in FIG. 6.

While the transition surface 94 provides increased clearance W3 to decrease wear and crop pressure, an insufficient amount of crop pressure can cause tumbling of the crop material or excessive slip between the crop and the rotor 40. To counteract this possible problem, vanes, such as vane 120, can be connected to an interior surface 122 of the transition surface 94. The vane 120 can have varying heights H1 and H2 along a length of the vane 120 relative to the interior surface 122 so that there is a constant clearance between the vane 120 and the rotor 40 along the length of the vane 120. As can be seen, the height H1 of the vane 120 is greater than the height H2 of the vane 120, since the clearance between the rotor 40 and the vane 120 is greater at the location of height H1 than height H2. It should therefore be appreciated that the heights H1 and H2 of the vane 120, and any subsequent vanes, can decrease in response to a reduced clearance between the vanes and the rotor 40.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. An agricultural harvester, comprising:
  a chassis; and
  a threshing and separating system carried by said chassis and configured for threshing and separating grain from gathered crop material, said threshing and separating system including:
    a rotor defining a longitudinal axis;
    a concave at least partially surrounding said rotor;
    a transition cone defining an infeed to said rotor; and
    a transition surface connecting said transition cone to said concave and having a conical portion defined about said longitudinal axis and a blended portion connected to said conical portion, said blended portion defining a first end connected to said conical portion and a second end distanced from said first end in a lateral direction, said blended portion defining a substantially conical shape about said longitudinal axis at said first end and approaching a substantially cylindrical shape about said longitudinal axis toward said second end, said transition surface having a transition length in a direction parallel to the longitudinal axis, the transition surface having a front and a back, the front of said transition surface at said first end of said blended portion having a diameter of said conical portion, the back of said transition surface at said first end of said blended portion having a cylindrical shape and a diameter, the diameter at the back of said transition surface at said first end of said blended portion being approximately equal to a diameter of the front of said transition surface at said second end of said blended portion.

2. The agricultural harvester according to claim 1, wherein said blended portion has a substantially cylindrical shape about said longitudinal axis at said second end along the transition length.

3. The agricultural harvester according to claim 1, wherein said transition cone defines a cone length, said transition length being greater than said cone length.

4. The agricultural harvester according to claim 1, wherein said blended portion defines a plurality of taper distances relative to said longitudinal axis, said taper distances decreasing from said first end of said blended portion toward said second end of said blended portion.

5. The agricultural harvester according to claim 4, wherein said blended portion defines a maximum radius relative to said longitudinal axis, a minimum radius relative to said longitudinal axis, and a maximum taper distance equal to the difference between said maximum radius and said minimum radius.

6. The agricultural harvester according to claim 5, wherein said concave defines a concave radius relative to said longitudinal axis, said minimum radius of said blended portion being equal to said concave radius.

7. The agricultural harvester according to claim 4, wherein a taper distance at said second end of said blended portion is approximately zero.

8. The agricultural harvester according to claim 1, further comprising a plurality of vanes connected to an interior of said transition surface, each of said plurality of vanes defining at least two vane heights and a vane clearance relative to said rotor, wherein said vane heights vary such that said vane clearances are constant.

9. A rotor housing, comprising:
a concave defining a cylindrical shape about a longitudinal axis; and
a transition surface connected to said concave and having a conical portion defined about said longitudinal axis and a blended portion connected to said conical portion, said blended portion having a first end connected to said conical portion and a second end distanced from said first end in a lateral direction, said blended portion defining a substantially conical shape about said longitudinal axis at said first end and approaching a substantially cylindrical shape about said longitudinal axis toward said second end, said transition surface having a transition length in a direction parallel to the longitudinal axis, the transition surface having a front and a back, the front of said transition surface at the first end of said blended portion having a diameter of said conical portion, the back of said transition surface at said first end of said blended portion having a cylindrical shape and a diameter, the diameter at the back of said transition surface at said first end of said blended portion being approximately equal to a diameter of the front of said transition surface at said second end of said blended portion.

10. The rotor housing according to claim 9, wherein said blended portion has a substantially cylindrical shape about said longitudinal axis at said second end along the transition length.

11. The rotor housing according to claim 9, further comprising a transition cone coupled to said transition surface, the transition cone having a cone length and said transition surface defines a transition length, said transition length being greater than said cone length.

12. The rotor housing according to claim 9, wherein said blended portion defines a plurality of taper distances relative to said longitudinal axis, said taper distances decreasing from said first end of said blended portion toward said second end of said blended portion.

13. The rotor housing according to claim 12, wherein said blended portion defines a maximum radius relative to said longitudinal axis, a minimum radius relative to said longitudinal axis, and a maximum taper distance equal to the difference between said maximum radius and said minimum radius.

14. The rotor housing according to claim 12, wherein a taper distance at said second end of said blended portion is approximately zero.

* * * * *